E. S. ARD.
LICENSE PLATE HOLDER.
APPLICATION FILED OCT. 7, 1919.

1,371,837.

Patented Mar. 15, 1921.

Inventor
E. S. Ard

UNITED STATES PATENT OFFICE.

ERNEST STANLEY ARD, OF ANTELOPE, SASKATCHEWAN, CANADA.

LICENSE-PLATE HOLDER.

1,371,837. Specification of Letters Patent. Patented Mar. 15, 1921.

Application filed October 7, 1919. Serial No. 329,044.

*To all whom it may concern:*

Be it known that I, ERNEST STANLEY ARD, of the town of Antelope, in the Province of Saskatchewan, Canada, have invented certain new and useful Improvements in License-Plate Holders, of which the following is the specification.

The invention relates to improvements in license plate holders and the object of the invention is to provide a simple, inexpensive and durable holder for a license plate such as used on an automobile, the holder being arranged so that it will effectively display the license plate at the front of the automobile and such that it can be quickly and easily attached to the automobile.

With the above object in view the invention consists essentially in a specially shaped bar in the form of a bracket and presenting supporting legs attachable one to the chassis and the other to the front mud guard of the automobile, the parts being arranged and constructed as hereinafter more particularly described and later pointed out in the appended claims, reference being had to the accompanying drawing in which:—

In the drawing like characters of reference indicate corresponding parts in the several figures.

Figure 1:
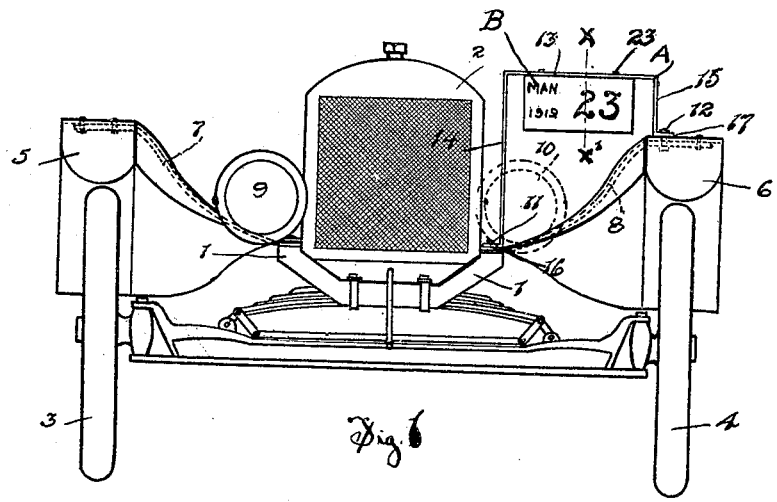
Figure 1 is a front view of the license plate holder as it appears on an automobile.
Figure 2:
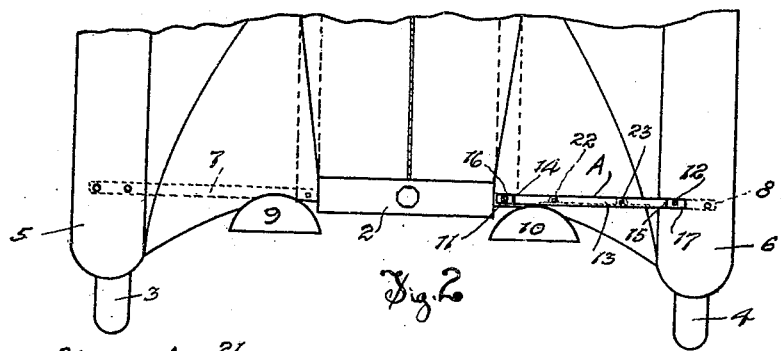
Fig. 2 is a plan view.
Figure 3:
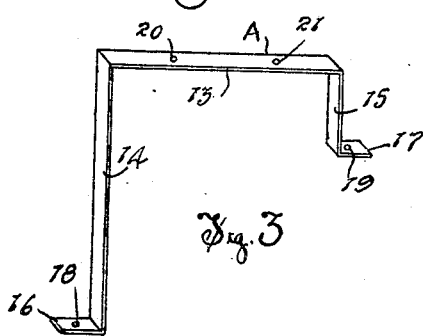
Fig. 3 is a perspective view of the holder.
Figure 4:
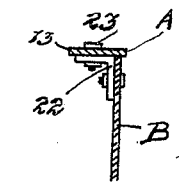
Fig. 4 is a vertical sectional view through the license plate and holder.

1 represents the chassis of an automobile, 2 the radiator, 3 and 4 the front steering wheels, 5 and 6 the front mud guards, 7 and 8 the side supports carrying the mud guards and 9 and 10 the customary headlights. The license plate holder A which I provide is fastened to the front corner of the chassis and to the top side of one of the mud guards, the fastening being made by means of the bolt 11 utilized to secure the radiator to the chassis and a further bolt 12 which I substitute for the customary inner rivet fastening the mud guard to the side support 8.

The holder is in the nature of a specially shaped bracket formed from a single piece of bar iron presenting an elevated horizontal body part 13 and bent to provide a long leg 14, a short leg 15 and outstanding foot pieces 16 and 17 at the ends of the legs. The foot pieces are fitted with bolt holes 18 and 19 and the cross member 13 with small fastening holes 20 and 21.

The customary license plate B is suspended from the horizontal part of the bracket in any suitable way such as by angle brackets 22 riveted to the back of the license plate and fastened by rivets or bolts 23 to the holder, the latter fastenings extending through the openings 20 and 21. When the holder is to be attached the nut fastening the radiator to the chassis is undone and the bolt 11 is passed through the hole 18 and then the nut is screwed back on to the bolt to hold the foot piece. One also cuts away and knocks out the customary inner rivet holding the mud guard to the side support and replaces it with the bolt 12 which is passed through the opening 19 of the foot piece 17 and fastened.

From the above it will be apparent that this is a very simple support which can be readily applied on automobiles and that when it is used the license plate is very prominently displayed at the front of the car.

What I claim as my invention is:—

A bracket for supporting a license plate in elevation between the radiator and one of the mud guards of an automobile comprising a bar presenting a horizontal portion adapted to support a license plate therefrom, a short leg depending from one end of the bar and secured to the top of the mud guard by one of the fastening members holding the mud guard on the usual supporting member provided therefor, a long leg depending from the opposite end of the bar secured at its lower end to the chassis by one of the bolts securing the radiator to the chassis, said bracket serving as an additional support or brace for the mud guard.

Signed at Antelope this 18th day of June 1919.

ERNEST STANLEY ARD.

In the presence of—
HELENA URANICS,
R. E. ALEXANDER.